United States Patent
Wang et al.

(10) Patent No.: US 11,373,802 B2
(45) Date of Patent: Jun. 28, 2022

(54) MAGNET MANUFACTURING BY ADDITIVE MANUFACTURING USING SLURRY

(71) Applicant: GM GLOBAL TECHNOLOGY OPERATIONS LLC, Detroit, MI (US)

(72) Inventors: Yucong Wang, West Bloomfield, MI (US); Dale A. Gerard, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 32 days.

(21) Appl. No.: 16/031,137

(22) Filed: Jul. 10, 2018

(65) Prior Publication Data

US 2020/0020481 A1    Jan. 16, 2020

(51) Int. Cl.
*H01F 41/02* (2006.01)
*B33Y 10/00* (2015.01)
(Continued)

(52) U.S. Cl.
CPC ....... *H01F 41/0273* (2013.01); *B29C 64/165* (2017.08); *B29C 64/188* (2017.08); *B33Y 80/00* (2014.12); *H01F 1/083* (2013.01); *H01F 1/086* (2013.01); *B22F 1/10* (2022.01); *B22F 3/15* (2013.01); *B22F 10/10* (2021.01); *B22F 2201/10* (2013.01); *B22F 2201/20* (2013.01);
(Continued)

(58) Field of Classification Search
CPC ....... B29C 64/00; B29C 64/10; B29C 64/124; B29C 64/129; B29C 64/135; B29C 64/153; B29C 64/165; B22F 3/00; B22F 3/008; B22F 3/15; B22F 7/008; B22F 2202/05; B22F 2301/35; B22F 2301/355; B22F 2303/40; B22F 2303/405; B22F 1/0059; B22F 1/0062; B22F 1/0074; B22F 2001/0066; B22F 2202/11; B22F 2301/45

See application file for complete search history.

(56) References Cited

U.S. PATENT DOCUMENTS 2,775,758 A    12/1956   Munz
4,388,131 A *  6/1983   Unger .................. G11C 19/085
                                                       156/89.12
(Continued)

FOREIGN PATENT DOCUMENTS

CN    102963002 A    3/2013
CN    105390224 A    3/2016
(Continued)

OTHER PUBLICATIONS

"Glossary of Metallurgical and Metalworking Terms," Metals Handbook, ASM Handbooks Online, ASM International, 2002, pp. 1, 169, 180, 257. (Year: 2002).*

(Continued)

*Primary Examiner* — Vanessa T. Luk
(74) *Attorney, Agent, or Firm* — Vivacqua Crane PLLC (57) ABSTRACT

A magnet and a method of forming the magnet are provided. The method includes forming a slurry comprising magnetic powder material and binder material and creating raw layers from the slurry. A magnetic field is applied to the raw layers to orient the magnetic powder material in a desired direction, and each layer is cured to form another layer on the most recent cured layer. The layers are attached together.

7 Claims, 4 Drawing Sheets

(51) Int. Cl.
*B22F 10/10* (2021.01)
*H01F 1/08* (2006.01)
*B33Y 80/00* (2015.01)
*B29C 64/165* (2017.01)
*B29C 64/188* (2017.01)
*B29K 505/12* (2006.01)
*B29K 33/00* (2006.01)
*B29K 77/00* (2006.01)
*B33Y 70/00* (2020.01)
*B22F 3/15* (2006.01)
*B22F 1/10* (2022.01)

(52) U.S. Cl.
CPC ..... *B22F 2202/05* (2013.01); *B22F 2301/355* (2013.01); *B29K 2033/08* (2013.01); *B29K 2077/00* (2013.01); *B29K 2505/12* (2013.01); *B29K 2995/0008* (2013.01); *B33Y 10/00* (2014.12); *B33Y 70/00* (2014.12)

(56) References Cited

U.S. PATENT DOCUMENTS

| | | | |
|---|---|---|---|
| 4,666,783 A | 5/1987 | Heil et al. | |
| 7,141,207 B2 | 11/2006 | Jandeska, Jr. et al. | |
| 9,079,357 B2 | 7/2015 | Ebert et al. | |
| 9,272,332 B2 | 3/2016 | Becker et al. | |
| 10,254,499 B1* | 4/2019 | Cohen | B23K 26/342 |
| 2004/0001973 A1* | 1/2004 | Gao | H01F 1/0027 428/692.1 |
| 2005/0104241 A1* | 5/2005 | Kritchman | B29C 64/112 264/40.1 |
| 2006/0139137 A1* | 6/2006 | Honkura | B22F 5/10 335/302 |
| 2011/0057756 A1* | 3/2011 | Marinescu | H01F 1/0576 335/302 |
| 2013/0056672 A1* | 3/2013 | Johnston | B33Y 10/00 252/62.54 |
| 2014/0293529 A1* | 10/2014 | Nair | H01Q 1/2291 361/679.31 |
| 2016/0001506 A1* | 1/2016 | Hirata | B29C 67/0081 428/446 |
| 2016/0064144 A1* | 3/2016 | Wang | H01F 1/0577 419/26 |
| 2016/0293306 A1* | 10/2016 | Sagawa | B22F 3/003 |
| 2016/0375492 A1* | 12/2016 | Bencher | B33Y 30/00 419/26 |
| 2018/0022033 A1* | 1/2018 | Fujita | B33Y 80/00 425/162 |
| 2018/0071978 A1 | 3/2018 | Lithoz | |
| 2018/0200946 A1* | 7/2018 | Opschoor | B29C 64/124 |
| 2019/0099940 A1* | 4/2019 | Dardona | B29C 64/129 |

FOREIGN PATENT DOCUMENTS

| | | | |
|---|---|---|---|
| CN | 105405636 A | | 3/2016 |
| CN | 107225248 A | * | 10/2017 |
| DE | 3418482 A1 | | 11/1985 |

OTHER PUBLICATIONS

U.S. Appl. No. 15/297,255, filed Oct. 19, 2016, titled "A Method of Manufacturing a Composite Article" by GM Global Technology Operations LLC.

U.S. Appl. No. 15/637,028, filed Jun. 29, 2017, titled "Near Net Shape Manufacturing of Magnets" by GM Global Technology Operations LLC.

U.S. Appl. No. 15/964,719, filed Apr. 27, 2018, titled "Near Net Shape Manufacturing of Magnets With Photosensitive Slurry" by GM Global Technology Operations LLC.

Ramji Pandey, Photopolymers in 3D Printing Applications, Degree Thesis, Plastics Technology, 2014, Arcada, No. 12873.

Additive manufacturing fabrication of permanent magnets for electric motors, National Research Council Canada, Jan. 24, 2018, Boucherville, Quebec, available at https://www.nrc-cnrc.gc.ca/eng/stories/2018/permanent_magnets.html, printed on Oct. 18, 2018.

Ling Li et al., Big Area Additive Manufacturing of High Performance Bonded NdFeB Magnets, Scientific Reports, Nature.com, Oct. 31, 2016, 6:36212 | DOI: 10.1038/srep36212, pp. 1-7.

* cited by examiner

MAGNET MANUFACTURING BY ADDITIVE MANUFACTURING USING SLURRY

FIELD

The present disclosure relates generally to permanent magnets and methods of forming anisotropic permanent magnets, which may be used in electric motors, wind mills, electric bikes, and appliances.

INTRODUCTION

Permanent magnets have been widely used in a variety of devices, including traction electric motors for hybrid and electric vehicles, as well as for wind mills, air conditioners and other mechanized equipment. Such permanent magnets may be ferrite, Nd—Fe—B, CmCo, CmFeN, Alnico, etc.

For Nd—Fe—B magnets, the manufacturing processes typically begin with the initial preparation, including inspection and weighing of the starting materials for the desired material compositions. The materials are then vacuum induction melted and strip cast to form thin pieces (less than one mm) of several centimeters in size. This is followed by hydrogen decrepitation, where the thin pieces absorb hydrogen at about 25° C. to about 300° C. for about 5 to about 20 hours, dehydrogenated at about 200° C. to about 400° C. for about 3 to about 25 hours, and then subjected to hammer milling and grinding and/or mechanical pulverization or nitrogen milling (if needed) to form fine powder suitable for further powder metallurgy processing. This powder is typically screened for size classification and then mixed with other alloying powders for the final desired magnetic material composition.

In one process, the magnetic powder is mixed with binders to make green parts (typically in the form of a cube) through a suitable pressing operation in a die. The powder may be weighed prior to its formation into a cubic block or other shape. The shaped part is then vacuum bagged and subjected to isostatic pressing, after which it is sintered (for example, at about 800° C. to about 1100° C. for about 1 to about 30 hours in vacuum) and aged, if needed, (for example, at about 300° C. to about 700° C. for about 5 to about 20 hours in vacuum). Typically, a number of blocks totaling about 100 kg to about 800 kg undergo sintering at the same time as a batch.

The magnet pieces are then cut and machined to the final shape from the larger block based on the desired final shape for the magnets. A cutting machine having numerous thin blades is used to cut desired shapes from the magnet block. Much of the material is lost in the cutting operation, and the thin blades require maintenance. The cutting and machining process to create the magnets having the desired shape typically results in a relatively large amount of material loss, where the yield is typically about 55 to 75 percent (i.e., about 25 to 45 percent loss of the material).

The high material loss during manufacturing and the machining operation have greatly increased the cost of the finished rare earth element magnets. This cost has been exacerbated by a rise in the price of the raw rare earth metals in the past several years. As such, there are significant problems associated with producing cost-effective magnets that contain rare earth materials.

SUMMARY

The present disclosure provides a novel method of producing magnets that includes printing magnetic powder material into a desired final shape of the magnet by printing a series of thin layers of magnetic powder material in a slurry into a three-dimensional shape, which does not require the magnet to be machined into another final shape. This results in a savings of material that is typically lost through the cutting and machining process of the magnet. Further, by printing the magnetic material in a slurry, a magnetic field may be applied to the slurry to orient the magnetic material in a desired direction prior to and during curing, and the viscosity from wetness of the slurry helps to retain the material in the anisotropic orientation prior to and during curing.

Thus, to orient the magnetic powder material in a desired direction, a magnetic field may be applied. Creating layers of dry loose magnetic powder material under a magnetic field may result in magnetic material moving substantially due to the magnetic field. The present disclosure, however, provides a wet slurry including magnetic powder material and binder material, wherein the slurry form of the material maintains the magnetic powder intact. The slurry can then be cured by any suitable means, such as a laser, to harden layers of the magnet layer by layer.

In one form, which may be combined with or separate from the other forms disclosed herein, a method of forming a magnet is provided. The method includes forming a slurry comprising magnetic powder material and binder material. The method includes creating a raw first layer from the slurry. The method further includes applying a magnetic field to the raw first layer to substantially orient magnetic powder material contained in the raw first layer in a desired direction and curing the raw first layer to form a cured first layer. After curing the raw first layer, the method includes creating a raw second layer from the slurry on top of and in contact with the cured first layer. The method includes applying a magnetic field to the raw second layer to substantially orient magnetic powder material contained in the raw second layer in the desired direction and curing the raw second layer to form a cured second layer, the cured second layer being attached to the cured first layer.

Additional features may be provided, including but not limited to the following: the step of applying the magnetic field to each raw layer being performed while curing the same raw layer; the step of applying the magnetic field to each raw layer being further performed for a predetermined time period prior to curing the same raw layer to substantially orient the magnetic powder material contained in the raw respective layer in the desired direction; disposing a plurality of additional layers, layer by layer, onto the cured second layer; each additional layer being formed from the slurry; in between disposing each additional layer, curing a most recent disposed additional layer to form a plurality of attached cured layers; providing the magnetic field having a magnetism in the range of 0.5 to 4 Teslas; providing a base; the step of creating the raw first layer from the slurry comprising printing the raw first layer onto the base; the step of creating the raw second layer from the slurry comprising printing the raw second layer onto the first layer; the step of disposing the plurality of additional layers, layer by layer, onto the second cured layer comprising printing each additional layer; and removing residual slurry prior to disposing each additional layer.

Further additional features may be provided, including but not limited to the following: the slurry further comprising an organic-based solvent; the curing steps being accomplished using a laser; the binder material comprising polyamide; the slurry having a ratio of at least 1.5:1 of magnetic material to binder material; the binder material being organic and comprising at least one of: polyvinyl alcohol (PVA), stearic acid, carnauba wax, phenolic resin, epoxy resin, nylon, polypropylene, polystyrene, and poly(methyl methacrylate) (PMMA); sintering the cured first and second layers and the plurality of attached cured layers; subjecting the cured first and second layers and the plurality of attached cured layers to either a sintering and/or a hot isostatic press (HIP) process; the slurry having a viscosity of less than 10 Pascal-seconds; homogenously mixing the magnetic material and the binder material to create the slurry; the magnetic powder material comprising at least one rare earth metal; the magnetic powder material comprising neodymium, iron, and boron; the magnetic powder material comprising dysprosium and/or terbium; and/or each layer having a thickness in the range of 5 to 500 micrometers. The HIPing process can be either capsulated with a metallic foil or container or uncapsulated, depending the pores are interconnected or not.

In addition, the present disclosure provides a magnet formed by any version of the method disclosed herein.

The above features and advantages, and other features and advantages of the present disclosure, will be readily apparent from the following detailed description of the many aspects of the present disclosure when taken in connection with the accompanying drawings and appended claims.

BRIEF DESCRIPTION OF THE DRAWINGS

The drawings are provided for illustration purposes only and are not intended to limit this disclosure or the claims appended hereto.

DETAILED DESCRIPTION

The present disclosure provides a permanent magnet and a process for making permanent magnets in such a way that material loss is reduced and a magnet having anisotropic properties is produced. The process greatly reduces or eliminates the need for subsequent machining operations, and allows the magnetic material to be oriented in a desired direction (an anisotropic orientation) without causing the loss of magnetic powder material.

Figure 1A:
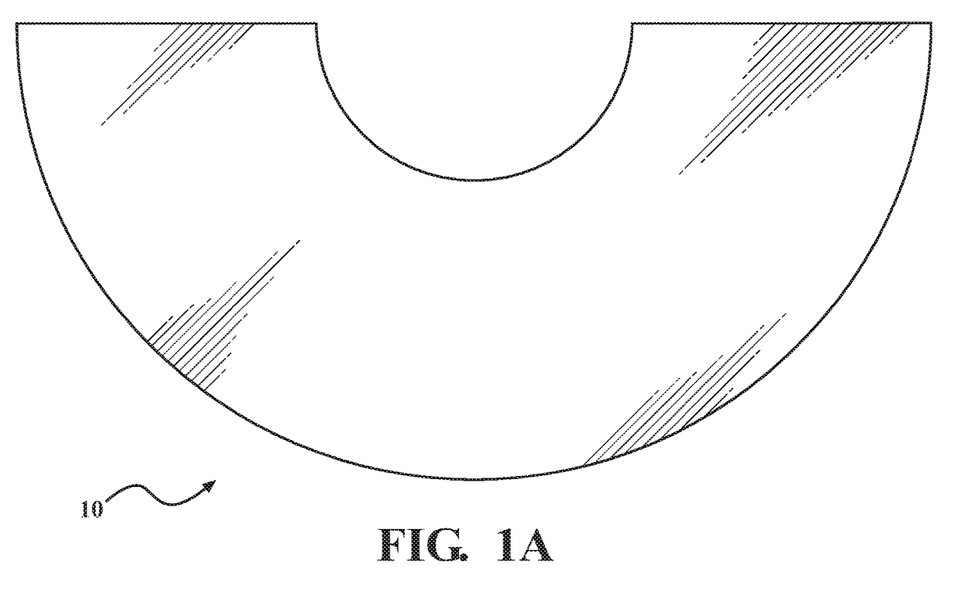
FIG. 1A is a plan view of an exemplary magnet, in accordance with the principles of the present disclosure.
Figure 1B:
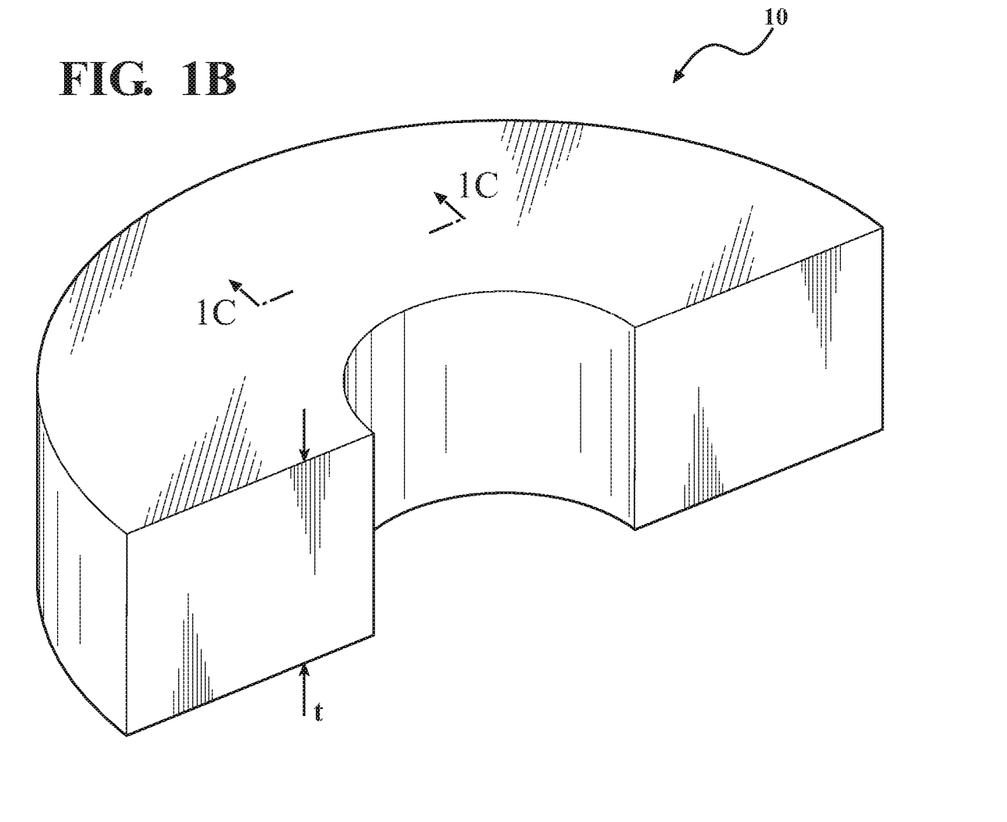
FIG. 1B is a perspective view of the magnet of FIG. 1A, according to the principles of the present disclosure.

Referring now to FIGS. 1A-1B, a permanent magnet is illustrated and generally designated at 10. In this variation, the permanent magnet 10 has a three-dimensional half-annulus shape with a thickness t; however, the permanent magnet 10 could have any other desired shape, without falling beyond the spirit and scope of the present disclosure. The permanent magnet 10 could be useful in electric motors and the like, or in any other desired application.

The magnet 10 may be a ferromagnetic magnet, having an iron-based composition, and the magnet 10 may contain any number of rare earth metals. For example, the magnet 10 may have a Nd—Fe—B (neodymium, iron, and boron) configuration. The magnet 10 may also contain Dy (dysprosium) and/or Tb (terbium), if desired. It is also contemplated that the magnet 10 may comprise additional or alternative materials, without falling beyond the spirit and scope of the present disclosure.

Figure 1C:
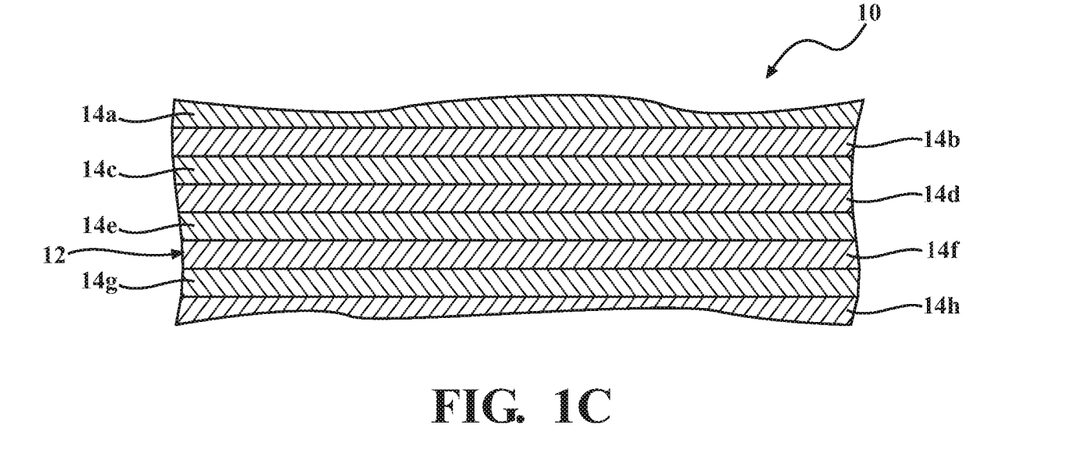
FIG. 1C is a cross-sectional side view of a portion of the magnet of FIGS. 1A-1B, taken along the line 1C-1C in FIG. 1B, in accordance with the principles of the present disclosure.

Referring now to FIG. 1C, the permanent magnet 10 is formed from a plurality of layers 12 that each contain magnetic material. Each of the layers 14a, 14b, 14c, 14d, 14e, 14f, 14g, 14h of the plurality of layers 12 may be created by 3D-printing or otherwise disposing the layers 14a, 14b, 14c, 14d, 14e, 14f, 14g, 14h contiguously, layer by layer, to form the shape of the permanent magnet 10. Thus, the magnet 10 is created, one layer 14a, 14b, 14c, 14d, 14e, 14f, 14g, 14h at a time, into substantially the final net shape desired. Though eight layers 14a, 14b, 14c, 14d, 14e, 14f, 14g, 14h are shown in FIG. 1C, any desired number of layers 14a, 14b, 14c, 14d, 14e, 14f, 14g, 14h may be provided. For example, many layers 14a, 14b, 14c, 14d, 14e, 14f, 14g, 14h, such as 300, may be provided.

In some variations, each layer 14a, 14b, 14c, 14d, 14e, 14f, 14g, 14h may have a height or thickness in the range of about 5-500 micrometers; for example, each layer 14a, 14b, 14c, 14d, 14e, 14f, 14g, 14h may have a height in a range of 3-100 micrometers. As such, if the magnet 10 may has a large plurality of layers, such as 300 layers, the magnet may have a resulting thickness t of about 3 mm, by way of example. Other thicknesses t could be in the range of about 1 to about 10 mm for electric motors, or any other desired magnet thickness t. Magnets used in wind mills are much bigger.

Figure 2:
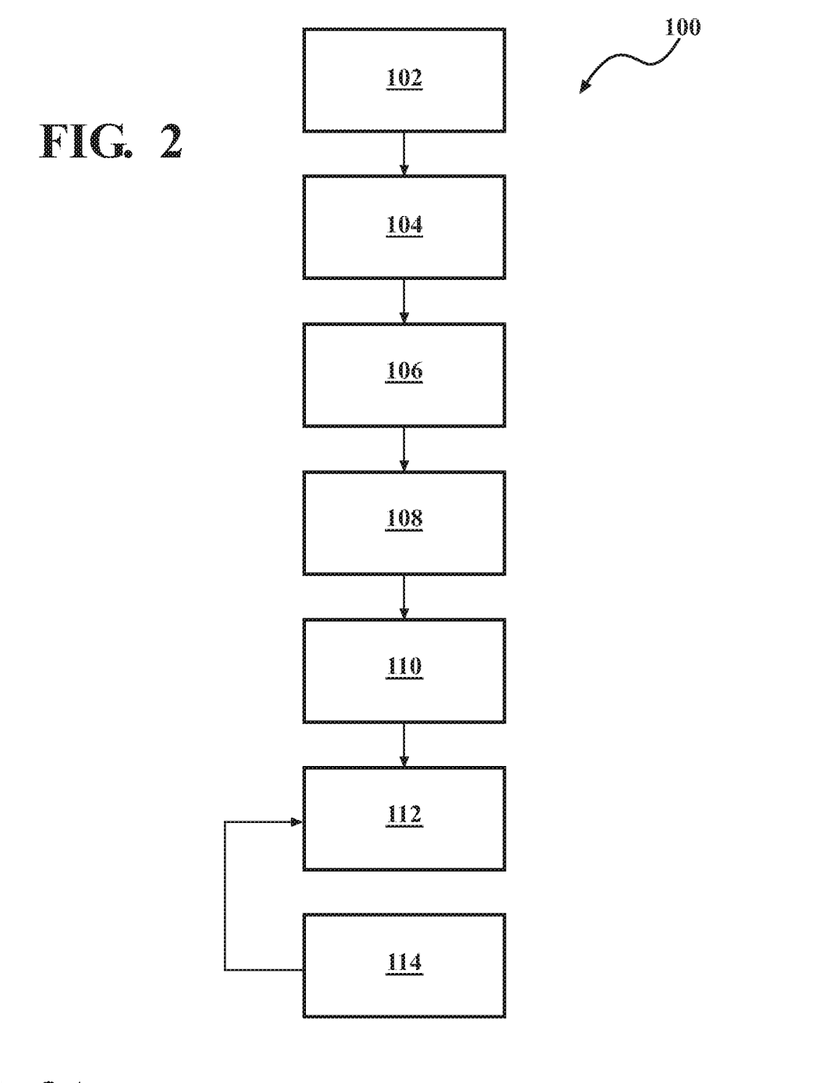
FIG. 2 is a block diagram illustrating a method of forming a magnet, according to the principles of the present disclosure.

Referring now to FIG. 2, the present disclosure provides a method 100 of near net shape forming a magnet, such as the magnet 10. The method 100 includes a step 102 of forming a slurry comprising magnetic powder material and binder material. The magnetic powder material may include any desired magnetic powders, such as powders of the materials described above (iron, neodymium, iron, boron, dysprosium, terbium, etc.) The slurry may further contain a solvent for making the slurry viscous and flowing. The solvent may be water-based, but in a preferable form, the solvent is an organic-based solvent such as kerosene or alcohol (e.g., ethanol or methanol) to avoid oxidizing the magnetic powder material. A binder material, which may be organic or inorganic, is also mixed into the slurry. The binder material may assist with holding the magnet powder material together until heat treated and/or sintered. The binder material may contain a polyamide and/or the binder material may be a polymer-based, non-magnetic material configured to enable adherence together of powder particles of the magnetic powder material. For example, the binder material may be organic and may include one or more of the following: polyvinyl alcohol (PVA), stearic acid, carnauba wax, phenolic resin, epoxy resin, nylon, polypropylene, polystyrene, and poly(methyl methacrylate) (PMMA). In some forms, a photopolymerizing material may also (optionally) be included to allow curing by light or other electromagnetic radiation; for example, ultraviolet (UV) light-curable organic binders (with photo-polymerization reactions) can also be used, such as 2-hydroxyethyl acrylate and polyethylene glycol 200 diacrylate, etc. Two commercially available UV curable resins can be used as binder: XC11122 (DSM) and UV-A 2137 (Sadechaf).

In some forms, the slurry may be viscous, such as having a viscosity of 2 or 3 Pascal-seconds, but preferably not exceeding 10 Pascal-seconds. The slurry may be formed by homogenously mixing the magnetic material and the binder material, as well as the solvent. Efforts can be made to reduce the viscosity of the slurry. For example, the use of diluents and a heating system may reduce the slurry's viscosity to certain extent.

Binder material is generally undesirable due to cost or other side effects. Such binders should be kept to a minimum to avoid contamination or reductions in magnetic properties. Thus, in some variations, the slurry has a ratio of at least 1.5:1 of magnetic material to binder material, and in some cases, the ratio of magnetic material to binder material may be at least 2:1.

Once the slurry is created, the method 100 includes a step 104 of creating a raw (uncured) first layer 14a' from the slurry. The raw first layer 14a' may be created, for example, by 3D printing, or the raw first layer 14a' may be created from the slurry in any other suitable manner.

Figure 3A:
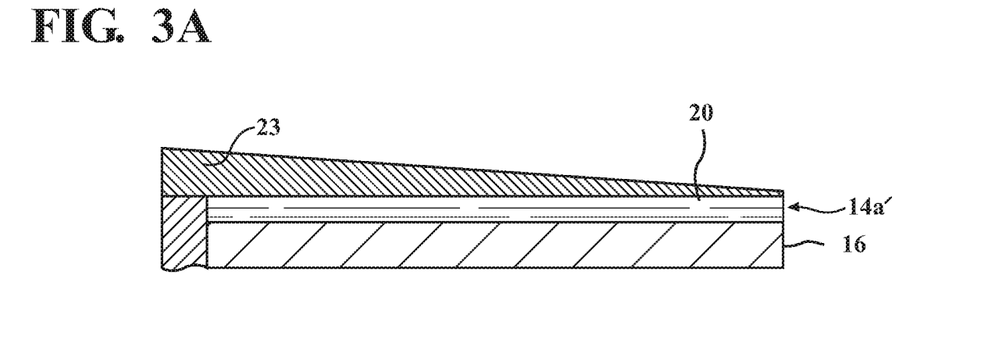
FIG. 3A is schematic cross-sectional view of an apparatus for forming the magnet of FIGS. 1A-1C at an initial step in a process of forming the magnet of FIGS. 1A-1C, in accordance with the principles of the present disclosure.

In one form, referring to FIG. 3A, a base 16 is provided, and a raw first layer 14a' of the slurry 20 may be deposited onto the base 16 with a knife 23, the knife 23 may be used to remove residual slurry, and the knife 23 may then be moved away and the raw first layer 14a' may be allowed to dry.

Figure 3B:
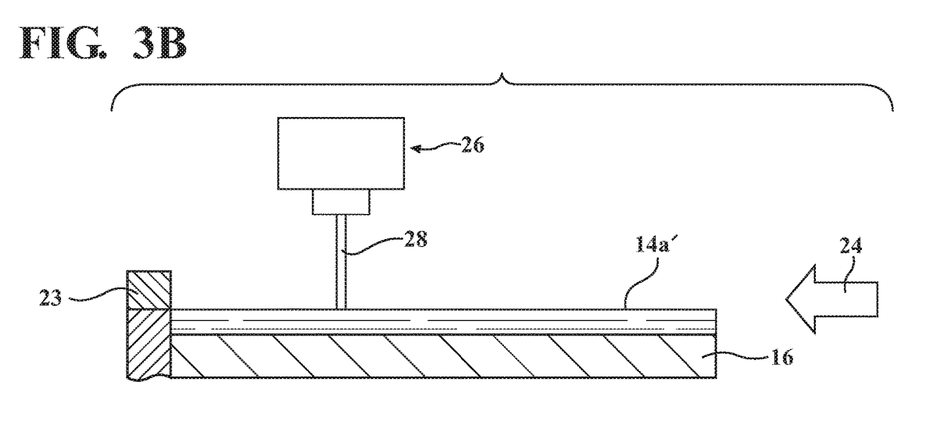
FIG. 3B is schematic cross-sectional view of the apparatus of FIG. 3A at a step in the process of forming the magnet of FIGS. 1A-1C after the step shown in FIG. 3A, according to the principles of the present disclosure.

Referring to FIGS. 2 and 3B, the method 100 includes a step 106 of applying a magnetic field (indicated at arrow 24 in FIG. 24) to the raw first layer 14a' to substantially orient magnetic powder material contained in the raw first layer 14a' in a desired direction. The method 100 includes a step 108 of curing the raw first layer 14a' to form a cured first layer 14a (shown in FIG. 1C and FIGS. 3C-3D). Curing 108 may be accomplished using a laser apparatus 26 that focuses a laser beam 28 onto the portions of the raw first layer 14a' that will form part of the magnet 10. The step 108 of applying the magnetic field 24 to the raw first layer 14a' is performed while curing the raw first layer 14a'. The step 106 of applying the magnetic field 24 to the raw first layer 14a' may further be performed for a first predetermined time period prior to curing the raw first layer 14a', in order to substantially orient the magnetic powder material contained in the raw first layer 14a' in the desired direction prior to curing the slurry 20 of the raw first layer 14a, because the curing process begins to lock the orientation of the magnetic powder materials into place. Thus, the magnetic field 24 is preferably applied for at least a short period of time prior to curing, and the magnetic field 24 is applied while the curing is taking place. The magnetic field 24 is preferably provided with a magnetism in a range of 0.5 to 4 Teslas, or 1 to 3 Teslas, or about 2 Teslas, by way of example. In some forms, the magnetic field 24 may be applied while printing or disposing the raw first layer 14a' on the base 16 and/or the magnetic field 24 may be applied continuously throughout the entire process of printing and curing each layer of the magnet 10, if desired. Providing the magnetic field orients the magnetic powder materials in slurry of the raw first layer 14a' to be oriented in a desired direction while the layer 14a' is being cured, and then the magnetic materials are locked into position after the curing. When the magnetic field 24 is applied during the curing step for each layer, the magnet 10 has an anisotropic orientation that may be, for example, 30% stronger in magnetic properties in a specific direction than an otherwise similar isotropic magnet.

As stated above, the curing step 108 may be accomplished using a laser beam 28, but in the alternative, curing may be accomplished in any other desirable way, such as by an electron beam, ultraviolet light, visible light, or another form of electromagnetic radiation, by way of example. The cured first layer 14a may be a cured shape based on a path of the laser beam 28 formed by computer aided design (CAD) input for the magnet 10.

Figure 3C:
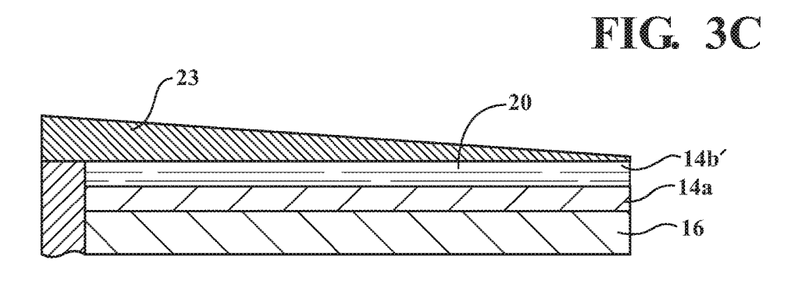
FIG. 3C is schematic cross-sectional view of the apparatus of FIGS. 3A-3B at a step in the process of forming the magnet of FIGS. 1A-1C after the step shown in FIG. 3B, in accordance with the principles of the present disclosure.

Referring to FIGS. 2 and 3C, after curing the raw first layer 14a', the raw first layer 14a' becomes the cured first layer 14a. The method 100 then includes a step 110 of creating a raw second layer 14b' from the slurry 20 in contact with the previous layer, which in this case is the cured first layer 14a, and the knife 23 may be used to remove residual slurry 20 from the raw second layer 14b'. It should be noted that each raw layer 14a', 14b' is evenly applied (preferably having a thickness in the range of a few micrometers to one millimeter) with the sharp knife 23. After applying the raw second layer 14b', the knife 23 may then be moved away, and the raw second layer 14b' may be allowed to dry.

Figure 3D:
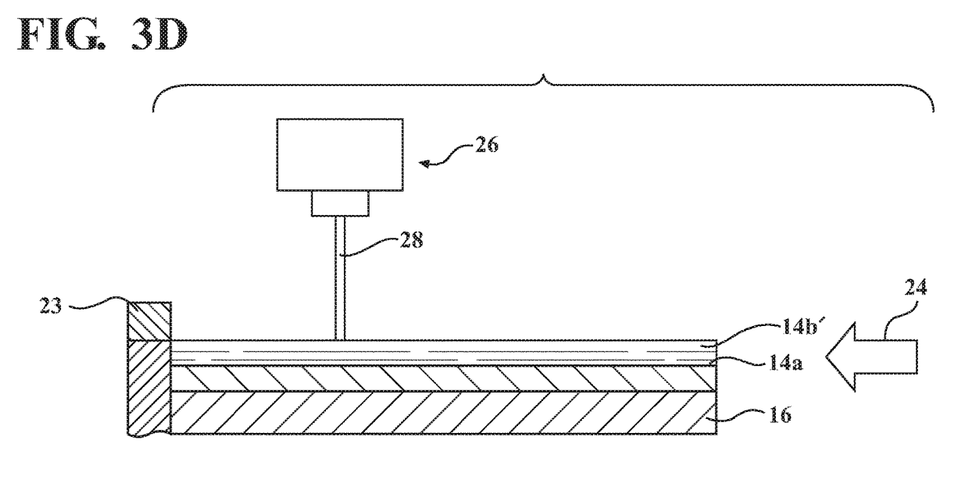
FIG. 3D is schematic cross-sectional view of the apparatus of FIGS. 3A-3C at a step in the process of forming the magnet of FIGS. 1A-1C after the step shown in FIG. 3C, according to the principles of the present disclosure.

Referring to FIGS. 2 and 3D, the method 100 includes a step 112 of applying a magnetic field 24 to the raw second layer 14b' to substantially orient magnetic powder material contained in the raw second layer 14b' in a desired direction. The method 100 includes a step 114 of curing the raw second layer 14b' to form a cured second layer 14b (shown in FIG. 1C). Curing 114 the second layer may be accomplished using the laser apparatus 26 that focuses a laser beam 28 onto the portions of the raw second layer 14b' that will form part of the magnet 10, or the curing step 114 may be accomplished in any other suitable way.

The step 112 of applying the magnetic field 24 to the raw second layer 14b' is performed while curing the raw second layer 14b'. The step 112 of applying the magnetic field 24 to the raw second layer 14b' may further be performed for a predetermined time period prior to curing the raw second layer 14b', in order to substantially orient the magnetic powder material contained in the raw second layer 14b' in the desired direction prior to curing the slurry 20 of the raw second layer 14b, because the curing process begins to lock the orientation of the magnetic powder materials into place. Thus, the magnetic field 24 is preferably applied for at least a short period of time prior to curing, and the magnetic field 24 is applied while the curing is taking place. As with the first layer 14a', the magnetic field 24 is preferably applied in a range of 0.5 to 4 Teslas. In some forms, the magnetic field 24 may be applied while printing or disposing the raw second layer 14b' on the base 16 and/or the magnetic field 24 may be applied continuously throughout the entire process of printing and curing each layer of the magnet 10, if desired.

After the raw second layer 14b' is cured into the cured second layer 14b, the cured second layer 14b is attached to the cured first layer 14a.

The method 100 may iteratively repeat steps 110, 112, and 114 to form additional layers on the other layers to form the entire magnet 10. Thus, the plurality of additional layers 14c, 14d, 14e, 14f, 14g, 14h may be disposed at first in raw form, layer by layer, onto the cured second layer 14b, with each additional layer being formed from the slurry 20, and in between disposing each additional layer, curing a most recent disposed additional layer under the application of the magnetic field 24, to form a plurality of attached cured layers 14c, 14d, 14e, 14f, 14g, 14h illustrated in FIG. 1C, in a similar or same manner as the above-described creation of the first and second layers.

After forming each of the cured layers 14a, 14b, 14c, 14d, 14e, 14f, 14g, 14h by disposing them in raw form and then curing them under a magnetic field 24 to form the magnet 10, the magnet 10 (including all of its layers 14a, 14b, 14c, 14d, 14e, 14f, 14g, 14h) may then be sintered and/or subjected to a hot isostatic press (HIP) process.

Thus, a magnet 10 formed that contains a plurality of layers 14a, 14b, 14c, 14d, 14e, 14f, 14g, 14h comprising magnetic powder material oriented in a desired direction.

The method 100 of forming the magnet 10 may include further optional steps, such as a step of initial preparation, including inspection and weighing of the starting materials for the desired material compositions. The method 100 may also include vacuum induction melting and strip casting of the starting materials to form thin pieces (less than one mm) of several centimeters in size. Hydrogen decrepitation may then be performed, where the thin pieces absorb hydrogen at about 25° C. to about 300° C. for about 5 to about 20 hours and then are dehydrogenated at about 200° C. to about 400° C. for about 3 to about 25 hours. The method 100 may also include pulverization, which may include hammer milling and grinding and/or mechanical pulverization or nitrogen milling (if needed) to form fine powder suitable for further powder metallurgy processing.

The method 100 may include mixing middling powder, milling, mixing fine powder, and blending different magnetic powders. For example, if the magnet 10 may be produced with a Nd—Fe—B configuration where at least some of the Nd is to be replaced by Dy or Tb, constituent powders may include the aforementioned iron-based powder containing Dy or Tb, as well as an Nd—Fe—B-based powder. In one form, such as for car or truck applications involving traction motors, the finished rare earth permanent magnets will have Dy by weight as high as about 8 or 9 percent. In other applications, such as wind turbines, the bulk Dy or Tb concentration may need to be on the order of 3 to 4 percent by weight. In any event, the use of permanent magnets in any such motors that could benefit from improved magnetic properties (such as coercivity) are deemed to be within the scope of the present disclosure. Additional constituents, such as the binders referred to above, may also be included into the mixture produced by blending, although such binders should be kept to a minimum to avoid contamination or reductions in magnetic properties. In one form, the blending may include the use of an iron-based alloy powder of Dy or Tb (for example, between about 15 percent and about 50 percent by weight Dy or Tb) being mixed with an Nd—Fe—B-based powder.

The magnetic powder may be screened for size classification and then mixed with other alloying powders for the final desired magnetic material composition, along with the binder material, to form a well-mixed, or homogenous, material. The solvent may then be added to form the slurry 20.

Thereafter, the plurality of layers 12 are printed, such as by a three-dimensional printer, as explained above. This may include use of the method shown in FIGS. 3A-3D above, or use of another 3D printing method. As described above, the steps 104, 110 of printing the layers may include printing the plurality of layers 12 into a desired final shape of the magnet 10, with little cutting and machining required thereafter. Each layer is cured while the magnetic field 24 is being applied to the respective layer to substantially orient the magnetic powder material in a desired direction to create an anisotropic magnet 10. Thus, the magnetic powder material is aligned under a magnetic field 24, which may provide a magnetism in the range of about 0.5 to 4 Tesla, and preferably about 2 Tesla. The magnetic field 24 will cause the individual magnetic particles of the mixture to align so that the finished magnet 10 will have a preferred magnetization direction. Thus, the finished magnet 10 may be provided having its constituent magnetic material disposed in an anisotropic orientation.

After laser curing/scanning, the magnetic powders are bound. After the whole "green" parts are made, they may be heated for thermal curing for increased strength. For making bonded magnets, no sintering is needed, and substantial organic binders will be left in the magnets. However, for making sintered magnets, the thermal curing process will remove most (or almost all) of the organic binders, and then they are subject to solid-state sintering.

In some forms, the cured layers 14a, 14b, 14c, 14d, 14e, 14f, 14g may be heated to a hardening temperature that is lower than the sintering temperature. For example, the hardening temperature may be less than 400 degrees C., however, this step may not be necessary in all forms. Hardening heating may result in "hardened green parts" or "brown parts" that are still not in final strength and microstructure because they should preferably undergo sintering to be fully hardened. After hardening, the magnet 10 is slightly hardened, but not as hard as the magnet 10 would be after sintering. However, in this step, most of the binder is burned off, and left a pure magnet composition and microstructure that is desired for improved magnetic properties.

If sintering is used, the magnet 10 is sintered at a temperature in the range of about 750 to about 1100 degrees C. The sintering may be performed in vacuum for about 1 to about 30 hours and aged, if needed, another heat treatment may be performed at about 300 degrees C. to about 700 degrees C. for about 3 to about 20 hours in vacuum.

Sintering can be performed in vacuum or in an inert atmosphere (for example, $N_2$ or Ar) to prevent oxidation. Typical sintering vacuum is in the range of about $10^{-3}$ and about $10^{-5}$ Pascals to achieve up to 99 percent theoretical density. Longer sintering times can further improve the sintered density. If the sintering time is too long, it may negatively impact both mechanical and magnetic properties due to over grown grains in microstructure. As with other forms of powder metallurgy processing, a cooling schedule may be used, where the sintered component is cooled over the course of numerous hours. Sintering may also include subjecting the layers 12 to a SiC heating element or high-powered microwaves.

Sintering is used to promote metallurgical bonding through heating and solid-state diffusion. As such, sintering, where the temperature is below that needed to melt the magnetic powder material, is understood as being distinct from other higher temperature operations that do involve partial melting of the powder material. Before sintering, a heat isostatic pressing (HIPing) may be used for improving the magnet density and simplifying the subsequent sintering process.

Additional secondary operations after the sintering may also be employed, including minor machining and surface treatment or coating.

In addition, HIPing may be applied to increase magnet density, or minimize porosity before or after sintering. HIPing may include subjecting the magnet 10 to a hot isostatic press (HIP) process. In an alternative configuration, hot forging may be used instead of the HIP process. In some variations, minor machining, such as polishing (for example, with ceramic or metallic powder) and/or grinding may be performed, if desired.

Surface treatment may then be applied, for example, the addition of an oxide or related coating in certain situations. For example, a protective layer or coating may be added. The protective coating may be applied on the finished magnets.

Laser heating is achieved with a CO2 laser gun as an example. The typical power is 110 V and 20 A. The build rate can be 16 cm$^3$/hr or 1 in$^3$/hr. Electron beam heating can also be used.

It will be apparent that modifications and variations are possible without departing from the scope of the invention defined in the appended claims. More specifically, although some aspects of the present disclosure are identified herein as preferred or particularly advantageous, it is contemplated that the present invention is not necessarily limited to these preferred aspects of the invention.

What is claimed is:

1. A method of forming a magnet, the method consisting of:
    forming a slurry comprising magnetic powder material and binder material, the magnetic powder material comprising one of dysprosium and terbium, the one of dysprosium and terbium being between about 15 weight percent and about 50 weight percent of the magnetic powder material;
    creating a raw first layer from the slurry, the raw first layer being viscous and flowing;
    applying a magnetic field to the raw first layer to orient magnetic powder material contained in the raw first layer in a desired direction, the magnetic field having a magnetism of 4 Teslas;
    curing the raw first layer to lock the orientation of the magnetic powder material in the desired direction and to form a cured first layer by focusing a laser beam onto portions of the raw first layer that will form part of the magnet while the magnetic field is applied to the raw first layer;
    after curing the raw first layer, creating a raw second layer from the slurry in contact with the cured first layer, the raw second layer being viscous and flowing;
    applying a magnetic field to the raw second layer to orient magnetic powder material contained in the raw second layer in the desired direction; and
    curing the raw second layer to lock the orientation of the magnetic powder material in the desired direction and to form a cured second layer by focusing a laser beam onto portions of the raw second layer that will form part of the magnet while the magnetic field is applied to the raw second layer, the cured second layer being attached to the cured first layer.

2. The method of claim 1, wherein the step of applying the magnetic field to the raw first layer is further performed for a first predetermined time period prior to curing the raw first layer to orient the magnetic powder material contained in the raw first layer in the desired direction, and the step of applying the magnetic field to the raw second layer is further performed for a second predetermined time period prior to curing the raw second layer to orient the magnetic powder material contained in the raw second layer in the desired direction.

3. The method of claim 2 wherein the slurry comprises an organic-based solvent.

4. The method of claim 3 wherein the binder material comprises a polyamide.

5. The method of claim 3 wherein the binder material is organic and comprises at least one of: polyvinyl alcohol (PVA), stearic acid, carnauba wax, phenolic resin, epoxy resin, nylon, polypropylene, polystyrene, and poly(methylmethacrylate) (PMMA).

6. The method of claim 5 wherein the slurry has a viscosity of less than 10 Pascal-seconds.

7. A method of forming a magnet, the method consisting of:
    forming a slurry comprising magnetic powder material and binder material, the magnetic powder material comprising one of dysprosium and terbium, the one of dysprosium and terbium being between about 15 weight percent and about 50 weight percent of the magnetic powder material;
    creating a raw first layer from the slurry, the raw first layer being viscous and flowing;
    applying a magnetic field to the raw first layer to orient magnetic powder material contained in the raw first layer in a desired direction;
    applying a first curing step consisting of:
        curing the raw first layer to lock the orientation of the magnetic powder material in the desired direction and to form a cured first layer by focusing a laser beam onto portions of the raw first layer that will form part of the magnet while the magnetic field is applied to the raw first layer;
    after curing the raw first layer, creating a raw second layer from the slurry in contact with the cured first layer, the raw second layer being viscous and flowing;
    applying a magnetic field to the raw second layer to orient magnetic powder material contained in the raw second layer in the desired direction; and
    applying a second curing step consisting of:
        curing the raw second layer to lock the orientation of the magnetic powder material in the desired direction and to form a cured second layer by focusing a laser beam onto portions of the raw second layer that will form part of the magnet while the magnetic field is applied to the raw second layer, the cured second layer being attached to the cured first layer.

* * * * *